(12) United States Patent
Means et al.

(10) Patent No.: US 6,213,047 B1
(45) Date of Patent: Apr. 10, 2001

(54) EMERGENCY VEHICLE EXTENDABLE SAFETY BARRIER

(76) Inventors: Steven P Means, 1992 Hillcrest Dr.; Edward L Means, P.O. Box 333, both of Newcastle, CA (US) 95658

( * ) Notice: Subject to any disclaimer, the term of this patent is extended or adjusted under 35 U.S.C. 154(b) by 0 days.

(21) Appl. No.: 09/236,197

(22) Filed: Jan. 23, 1999

(51) Int. Cl.[7] .............................. B60Q 11/00; B60Q 1/26
(52) U.S. Cl. ........................................ 116/28 R; 116/35 R
(58) Field of Search ............................... 116/28 R, 35 R, 116/30, 39, 46, 50, 51, 52, 53, 54, 63 R, 63 P, 321, 309; 340/480, 482, 487, 473, 471, 472

(56) References Cited

U.S. PATENT DOCUMENTS

| | | | |
|---|---|---|---|
| 2,144,813 | * | 1/1939 | Roan et al. ............................ 340/487 |
| 3,153,398 | * | 10/1964 | Runkle et al. .......................... 116/39 |
| 3,236,552 | * | 2/1966 | Percifull .............................. 116/28 R |
| 3,788,268 | * | 1/1974 | Hiatt et al. ........................... 116/28 R |
| 4,430,638 | * | 2/1984 | Parker ................................. 340/473 |
| 4,565,152 | * | 1/1986 | Bennett ................................. 116/50 |
| 4,697,541 | * | 10/1987 | Wicker ................................. 116/28 R |
| 4,825,192 | * | 4/1989 | Wells .................................... 340/433 |
| 4,920,910 | * | 5/1990 | Lin ....................................... 116/173 |
| 4,977,849 | * | 12/1990 | Brinton ................................ 116/28 R |
| 4,992,788 | * | 2/1991 | Arndt ................................... 340/908 |
| 5,038,136 | * | 8/1991 | Watson ................................. 340/480 |
| 5,140,933 | * | 8/1992 | Nishina et al. ....................... 116/209 |
| 5,249,381 | * | 10/1993 | Panossian ............................. 40/591 |
| 5,406,251 | * | 4/1995 | Leis ..................................... 340/433 |

* cited by examiner

*Primary Examiner*—Jacob K. Ackun
*Assistant Examiner*—Faye Francis
(74) *Attorney, Agent, or Firm*—Michael I. Kroll

(57) ABSTRACT

The present invention 10 discloses a telescopic device 14 mounted onto the side of an emergency vehicle 12 which has reflectors, 16, lights, or a caution sign 22 mounted on its rear facing surface so that when it is in its extended position the reflectors, lights, or caution sign are visible to the oncoming traffic and thereby act as a safety warning. The device has a base 21 for being mounted directly onto the side of the emergency or maintenance vehicle 12. The base 21 contains a hinge 21 about which the telescopic member rotates. Each telescopic section of the telescopic member 14 has means for stopping 26 each other section comprising overlapping lips 26 which allow the sections to be extended.

1 Claim, 7 Drawing Sheets

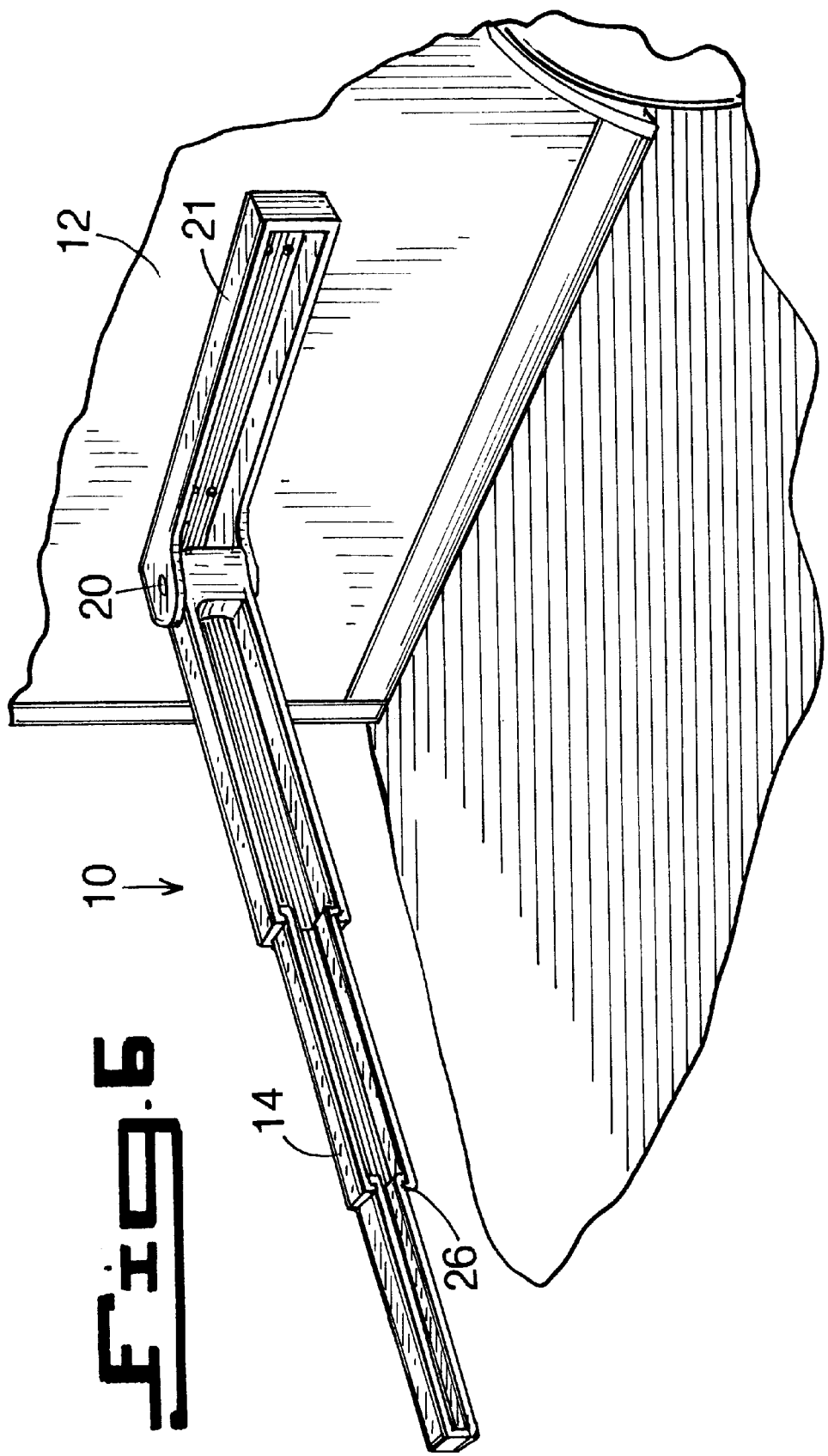

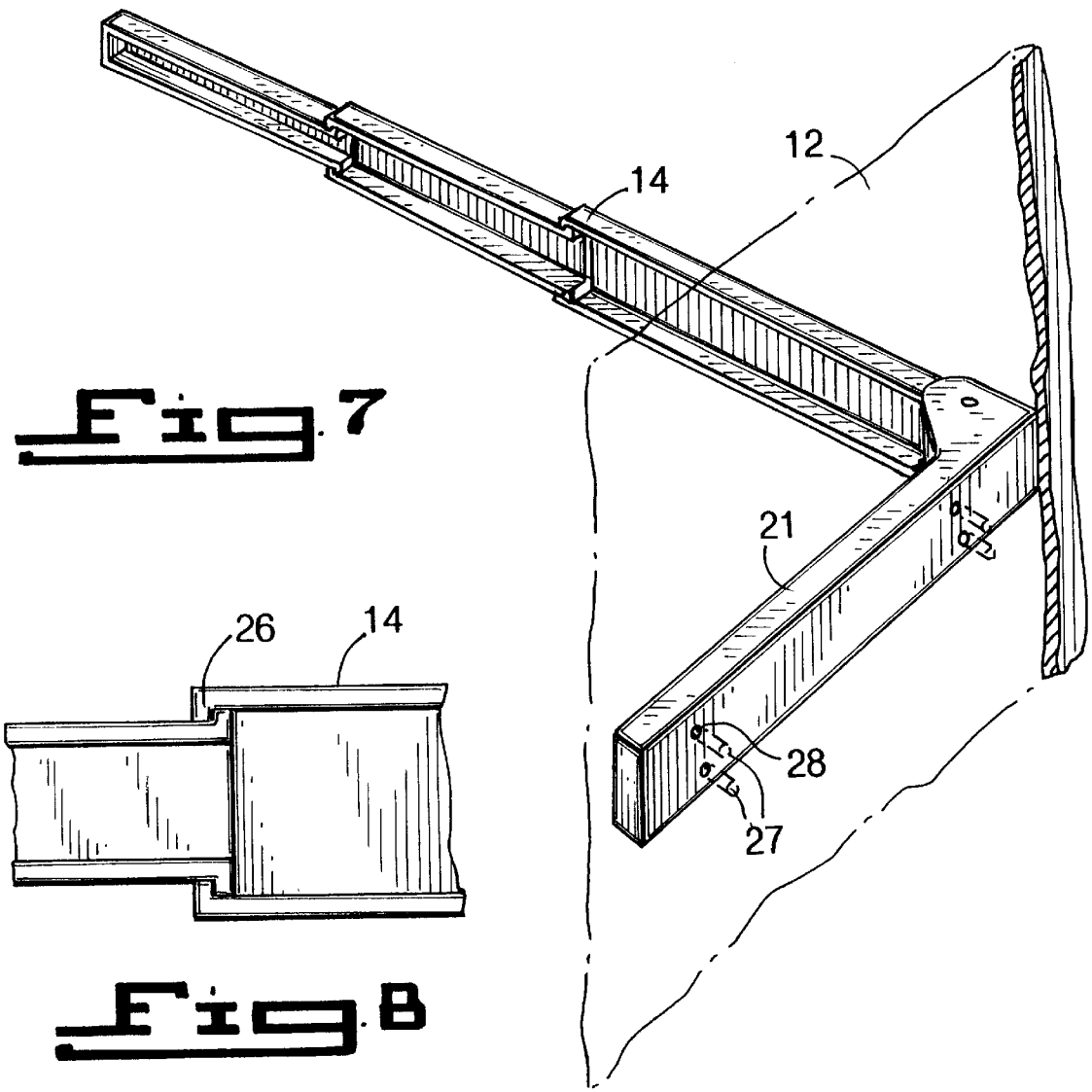

EMERGENCY VEHICLE EXTENDABLE SAFETY BARRIER

BACKGROUND OF THE INVENTION

1. Field of the Invention

The present invention relates generally to traffic barriers and, more specifically, to a pivotal locking telescopic safety barrier for mounting to a vehicle such as ambulances, fire trucks, rescue vehicles, and highway vehicles whereby said vehicle can immediately extend and lock the telescopic barrier creating a safe working perimeter around the aforementioned vehicles. The telescopic safety barrier comprises a housing and a pivotally attached telescopic member and can be mounted to the vehicle either permanently by means of fasteners or adhesives, or temporarily mounted using magnetic or vacuum means.

Said housing being a compartment for said telescopic member in its closed nonoperative position and having an aperture located on the pivotal end surface of said housing receiving the spring loaded locking member located on the upper surface of the first member of said telescopic member being utilized to lock said telescopic member in the operative extended position and a pin in the other distal end of said housing for locking said telescopic member in the nonoperative closed position.

2. Description of the Prior Art

There are numerous methods presently being employed to indicate the existence of an emergency condition or work site on streets and highways usually involving flares and/or cones which are not clearly visible to following motorists, having been placed on the ground, thereby requiring the presence of a flagman or public official placed in the path of the oncoming vehicles to redirect traffic causing unsafe conditions for them and for the other individuals at the site.

SUMMARY OF THE PRESENT INVENTION

The present invention is a pivotal locking telescopic safety barrier mounted to vehicles such as ambulances, fire trucks, rescue vehicles, and highway vehicles whereby said vehicles can immediately extend and lock the telescopic barrier creating a safe working perimeter around the aforementioned vehicles while said vehicles are attending to the emergency conditions or work site conditions.

A primary object of the present invention is to provide a telescopic safety barrier that can be mounted to one or more sides of a vehicle either permanently by means of fasteners or adhesives, or temporarily using magnetic or vacuum means.

Another object of the present invention is to provide a telescopic safety barrier comprising a housing and a pivotally mounted telescopic barrier.

A still further object of the present invention is to provide a telescopic barrier that can be selectively extended transversely from one or more sides of said vehicle.

A yet further object of the present invention is to provide a telescopic safety barrier having locking means while in the closed non-operative position and further having locking means while said telescopic barrier is in the extended operative position.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar pairs throughout the several views.

In order that the invention may be more fully understood, it will now be described, by way of example, with reference to the accompanying drawings in which:

FIG. 6 is a perspective view looking toward the rear of the vehicle showing the back view of the present invention. Shown are the details of the structure and in particular the stopping arrangement as each of the sections of the telescopic barrier member is selectively extended to the fully open position.

FIG. 7 is a cutaway rear perspective view of the telescopic safety barrier with the telescopic barrier member in the fully extended and operation position showing one means of attaching said telescopic safety barrier to the vehicle using fasteners.

FIG. 8 is an enlarged rear elevational view showing the stopping arrangement between two of the sections of the telescopic barrier member in the extended position.

DESCRIPTION OF THE PREFERRED EMBODIMENT(S)

Figure 1:
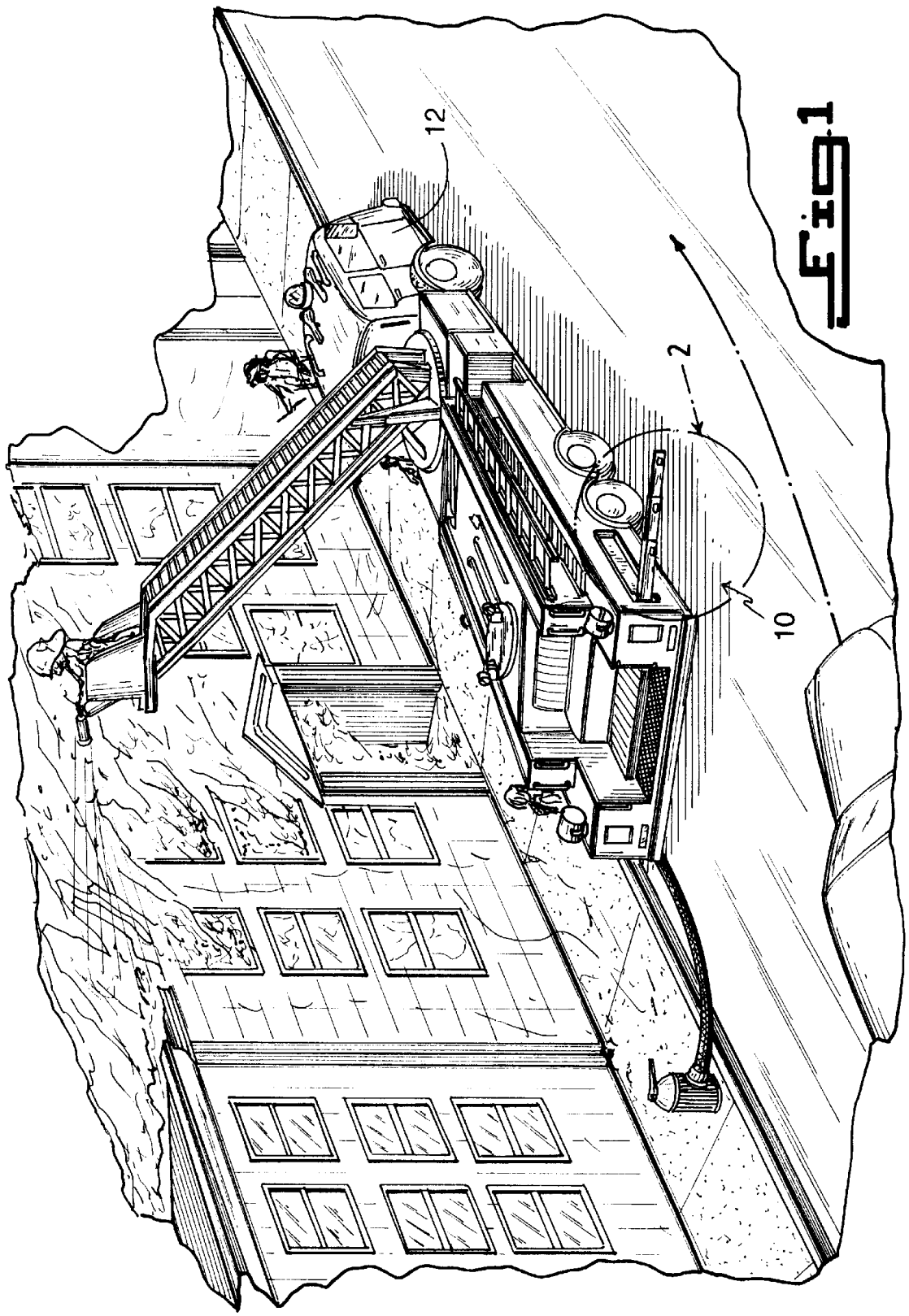
FIG. 1 is a perspective view of an emergency vehicle using the present invention to create a perimeter around said emergency vehicle by redirecting traffic using tile extended telescopic barrier.

Turning now descriptively to the drawings, in which similar reference characters denote similar elements throughout the several views, FIGS. 1 through 8 illustrate the present invention being a pivotal locking telescopic safety barrier for mounting onto a vehicle.

Turning to FIG. 1, therein is shown a perspective view of an emergency vehicle using the present invention generally shown at 10. The present invention 10 is used to create a barrier or recognizable perimeter around the emergency vehicle 12 by redirecting traffic using the extended telescope barrier of the present invention 10. The present invention mounts on the rear of the emergency vehicle 12 on the side(s) facing oncoming traffic flow.

Figure 2:
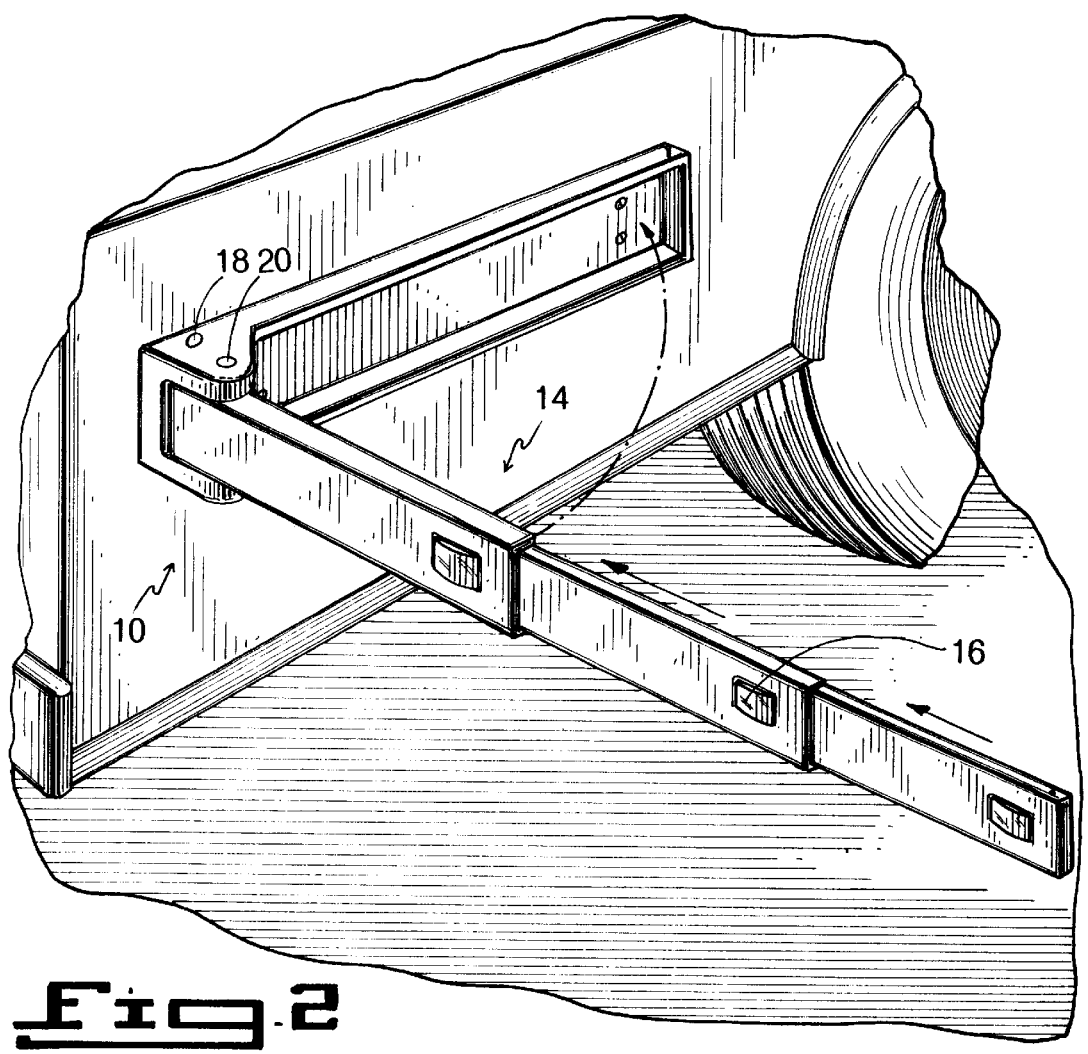
FIG. 2 is an enlarged perspective view, taken from FIG. 1 as indicated, showing one embodiment of the telescopic safety barrier with the telescopic barrier member in the fully extended position having reflectors or lights disposed thereon. Also shown are a number of arrows indicating how the barrier can be telescoped and then rotated to a closed position and locked in place for travel by a pin.

Turning to FIG. 2, therein is shown an enlarged perspective view, taken from FIG. 1 as indicated, showing one embodiment of the telescope safety barrier of the present invention 10. Therein is shown the emergency vehicle 12 having the present invention 10 mounted on its rear side so that it is observable by oncoming traffic. Shown is the telescope barrier member 14 in the fully extended position having reflectors 16, or lights, or the like disposed thereon. Also shown are a number of arrows indicating that the barrier member 14 is telescopic and can thereby be closed and be rotated to a closed position and locked in place for travel by locking means or pin 18. Note that a hinge 20 is provided about which the telescoping member 14 rotates to its closed position. The member 14 is expected to be extendable from about 4 feet in its closed position to about 12 feet so that if necessary it can block an entire lane of traffic and could be made of aluminum, fiberglass or the like.

Figure 3:
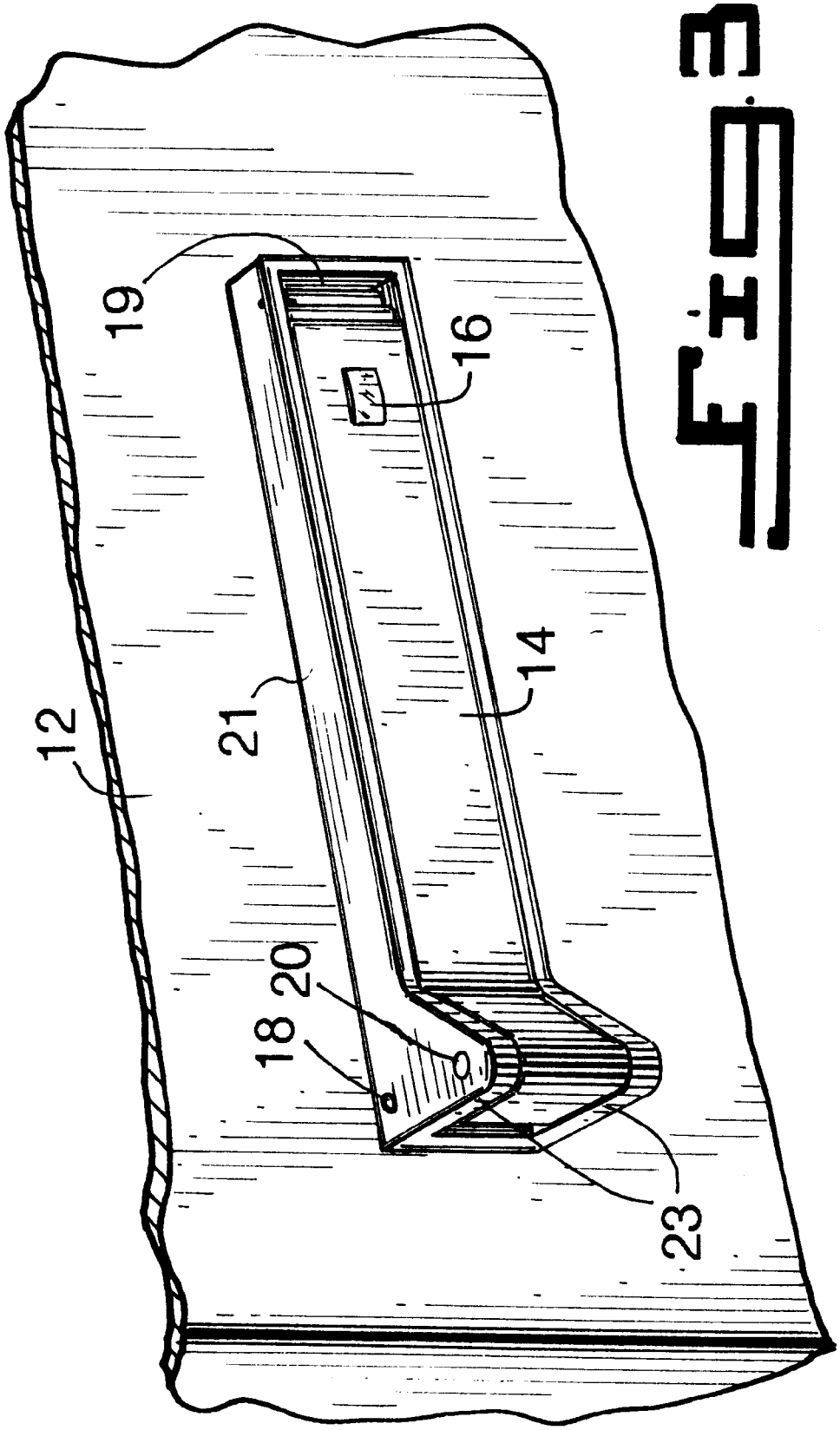
FIG. 3 is an enlarged perspective view showing the telescopic safety barrier with the telescopic barrier member in the fully closed and locked position for travel.

Turning to FIG. 3, therein is shown an enlarged perspective view showing the telescopic safety barrier with the telescopic barrier member 14 in the fully closed and locked position for travel. Shown is the base 21 of the telescopic member 14 having a pin 18 therein being attached to the emergency vehicle 12. Also shown is a safety reflector 16 and hinge 20. Note that the base 21 has a recessed area 19 which runs the length of the base 21 within which the telescopic member 14 is housed when in the closed position. The base has an enlarged upper and lower flange area 23 on one end which together form a means for pivotally mounting the telescopic member 14 thereon using a hinge 20 or the like.

Figure 4:
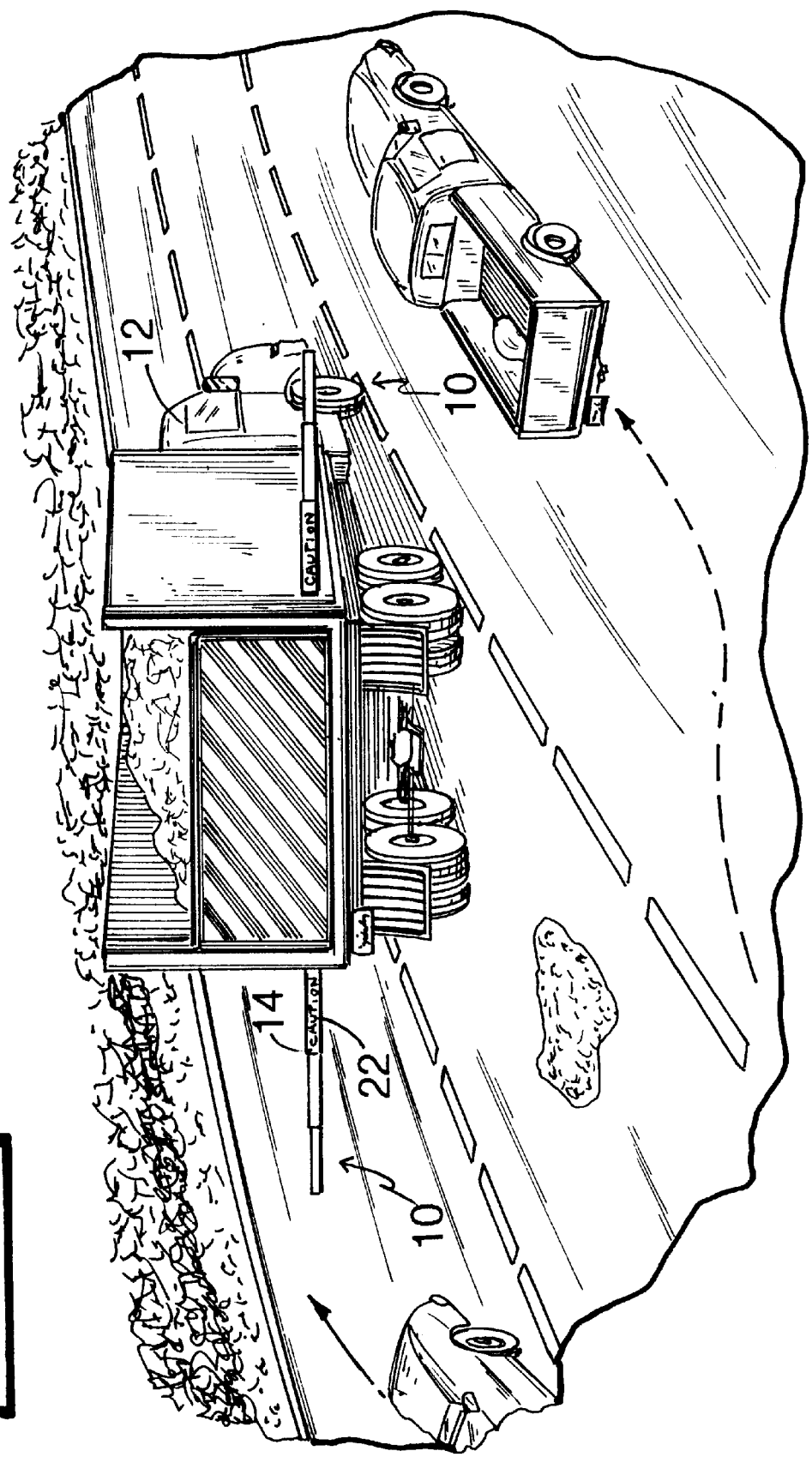
FIG. 4 is a perspective view of another embodiment of the present invention installed on each side of a highway maintenance vehicle diverting traffic around said vehicle and having a caution sign installed thereon.

Turning to FIG. 4, therein is shown a perspective view of another embodiment of the present invention 10 installed on each rear side of a highway maintenance vehicle 12 which thereby directs traffic around the vehicle 12 having a caution sign 22 installed on the face of the telescopic member 14 whereby the caution sign is visible to oncoming traffic. The members 14 can be used together or independently.

Figure 5:
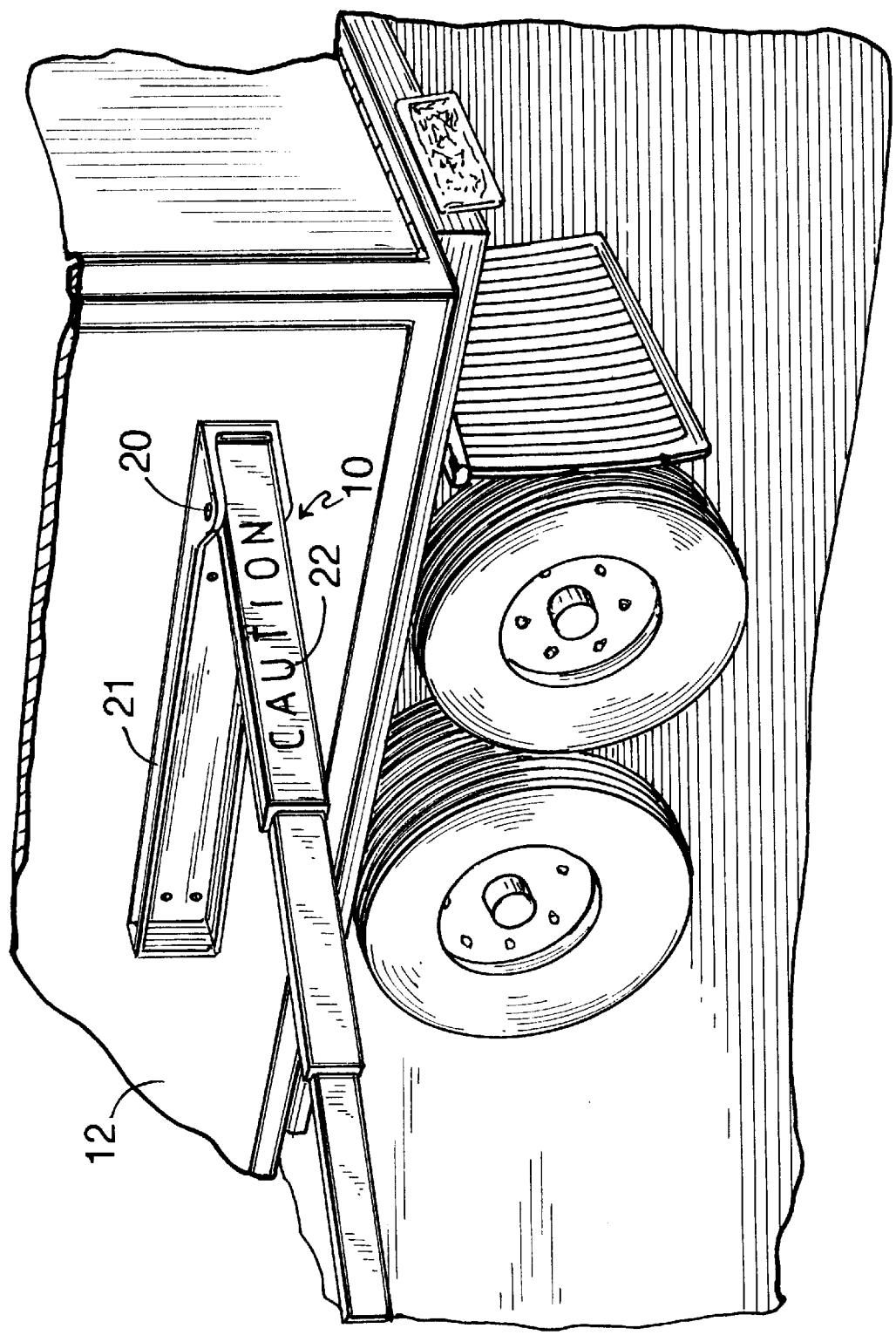
FIG. 5 is an enlarged perspective view of the embodiment shown in FIG. 4 having the telescopic barrier member in the fully extended and locked position and having the caution sign incorporated thereon.

Turning to FIG. 5, therein is shown an enlarged perspective view of the embodiment of the present invention 10 shown in FIG. 4 having the telescopic barrier member 14 in the fully extended and locked position having the caution sign 22 appearing on its face. Also shown is the base 21 along with the vehicle 12 and hinge 20.

Turning to FIG. 6, therein is shown a perspective view looking toward the rear of the emergency vehicle 12 showing tile back side of the present invention 10. Shown are the details of the structure and in particular the means 26 for stopping or securing each telescopic section as each succeeding section of the telescopic barrier member 14 is selectively extended to the fully open position. Also shown is the base 21 along with the hinge 20. Note that the means 26 comprises a member, lip member or overlapping lip or shoulder members allowing each extended smaller cross-section male telescopic section to be attached to each preceding larger cross-section female telescopic section with the male lip extending outwardly and the female lip extending inwardly.

Turning to FIG. 7, therein is shown a cut away rear perspective view of the telescopic safety member 14 with the telescopic member in the fully extended and operable position showing one means 27, e.g., metal screws, rivets or the like, for attaching said telescopic safety barrier base 21 to the vehicle 12 using fasteners 27. Note that the fasteners 27 extend through apertures 28 in the base 21 of the telescopic member 14 which base 21 is contiguously mounted to the vehicle 12 so that the telescopic member 14 is generally horizontally extended. Other means for fastening means 27 could be adhesives, magnetic, vacuum, or suction cup means.

Turning to FIG. 8, therein is shown an enlarged rear elevation view showing the stopping arrangement member 26 in relation to other sections of the telescopic barrier member 14 in the extended position. Note that the stopping means 26 is located on the inner end of each telescopic male member and the outer end of each telescopic female member and comprises overlapping lip members which couple or mate to each other as each inner member is extended.

LIST OF REFERENCE NUMERALS

With regard to the reference numerals used, the following numbering is used throughout the drawings.
10 present invention
12 vehicle
14 telescopic member
16 reflectors
18 pin
19 recess
20 hinge
21 base
22 caution sign
23 flange
26 stopping means
27 fasteners
28 aperture

What is claimed is:

1. An apparatus for a vehicle safety warning, comprising:
a) a base for mounting onto a side of the vehicle, said base having a recessed area formed by a rectangular shaped flat bottom attached to said vehicle and walls on four sides forming said recess;
b) a telescoping member comprising an elongated arm with telescoping extensions, said elongated arm having a proximal end and a distal end from which said extensions are extensible;
c) said elongated arm and telescoping extensions each having a front face and side walls forming hollow recesses allowing for axial telescoping of said extensions with safety warning symbols attached to an outside surface of each front face of said elongated arm and telescoping extensions;
d) means comprising a pin for pivotally attaching the proximal end of said elongated arm to said base, said telescoping member movable between a nested position completely within said recess of said base with said extensions retracted into said elongated arm and a deployed position with said telescoping member at right angles to said base and side of the vehicle permitting said extensions to be fully extended with the warning symbols displayed;
e) means for mounting said base onto the vehicle whereby deployment of said telescopic member provides a warning to approaching vehicles; and
f) stopping means on said elongated arm and extensions for limiting outward extension of each extension, said stopping means comprising overlapping shoulder members.

* * * * *